United States Patent [19]

Rung et al.

[11] Patent Number: 5,180,193
[45] Date of Patent: Jan. 19, 1993

[54] ELASTOMER-LINED METAL PIPE

[75] Inventors: Robert Rung, Hopatcong; Douglas R. Dole, Whitehouse Station, both of N.J.

[73] Assignee: Victaulic Company of America, Easton, Pa.

[21] Appl. No.: 810,520

[22] Filed: Dec. 19, 1991

[51] Int. Cl.⁵ .................................. F16L 55/04
[52] U.S. Cl. ................................ 285/55; 285/112; 285/149; 138/109
[58] Field of Search ............... 285/55, 110, 111, 112, 285/149, 58, 59, 45; 138/109, 137, 140, 141, 143

[56] References Cited

U.S. PATENT DOCUMENTS

| | | | |
|---|---|---|---|
| 199,349 | 1/1878 | Caswell | 138/109 |
| 2,225,615 | 12/1940 | Bay | 285/55 |
| 2,766,518 | 10/1956 | Costango | 285/112 X |
| 3,251,612 | 5/1966 | Webbe | 285/55 X |
| 3,253,841 | 5/1966 | Ahmod | 285/55 |
| 3,563,573 | 2/1971 | Crompton | 285/55 |
| 3,606,659 | 9/1971 | Robbins | 138/109 X |
| 4,132,382 | 1/1979 | Jackson | 285/55 X |
| 4,334,121 | 6/1982 | Kutnyak | 138/109 X |
| 4,449,742 | 5/1984 | Toerner et al. | 138/109 X |

FOREIGN PATENT DOCUMENTS

| | | | |
|---|---|---|---|
| 0647206 | 8/1962 | Canada | 285/55 |
| 1575207 | 1/1970 | Fed. Rep. of Germany | 285/55 |
| 0367670 | 4/1963 | Switzerland | 285/55 |
| 0858368 | 1/1961 | United Kingdom | 285/112 |

Primary Examiner—Randolph A. Reese
Assistant Examiner—Heather Chun
Attorney, Agent, or Firm—Abelman Frayne & Schwab

[57] ABSTRACT

A lined pipe has a continuous impervious coating of an elastomer extending along the inner periphery of the pipe and along the radial end surfaces thereof, and a portion thereof extending over the outer surface of the pipe which progressively decreases in thickness to zero thickness at a position underlying a sealing lip of an elastomeric gasket to be associated with the lined metal pipe.

6 Claims, 2 Drawing Sheets

ELASTOMER-LINED METAL PIPE

FIELD OF THE INVENTION

This invention relates to metal pipe that has been provided with a lining, and, in particular relates to such pipes for use in conjunction with segmented pipe couplings.

BACKGROUND OF THE INVENTION

The technique of lining metal pipes with an elastomeric material to permit the use of such pipes for conveying acidic caustic, corrosive or abrasive liquids is well-known in the art, including the lining of such pipes for use in conjunction with segmented pipe couplings.

A segmented pipe coupling is comprised of arcuate coupling segments that contain and confine an elastomeric seal, and, which are secured to each other at adjacent mutually-presented ends of the respective coupling segments by traction bolts. On tightening down of the traction bolts, the traction bolts act to draw the coupling segments into engagement with the ends of a pipe or fitting, and, in so doing, act to compressively engage the contained elastomeric seal with the periphery of the pipe ends.

While reference is made to pipes throughout this disclosure, it will be understood that the pipe can be comprised of a nipple of a flanged coupling, or, a nipple of any other type of fitting, such as a tap, valve, Y- or T-, or any other type of fitting that provides a nipple to be coupled to an adjacent pipe end by means of a segmented pipe coupling.

In one method, the lining of such pipes is accomplished by inserting a quantity of an uncured plastisol of polymeric material into the bore of the pipe, and, then rotating the pipe to spread the liquid polymer evenly throughout the pipe bore, either under the influence of gravity, or, under the influence of centrifugal action.

During the rotation of the pipe, the elastomeric material is permitted to cure, and thus form a continuous coating or lining on the pipe interior of a material that is impervious and chemically non-reactive to the liquid to be conveyed by the pipe.

End dams commonly are employed in such an operation, the end dams being operative to cast a coating of the elastomeric material onto the radially extending end surfaces of the pipe, and, in some instances, also to cast a layer of the elastomeric material onto the exterior of the pipe ends at positions adjacent to the respective ends thereof.

This latter type of casting procedure is the one that commonly is employed when the pipe is intended for use with segmented pipe couplings.

The more common method of elastomeric lining uses sheet stock positioned in the pipe bore, stretching it over the radially extending pipe end, and onto the outside diameter. The elastomer on the outside diameter is sized and shaped by mechanical buffing, or knives, either manually or by machine or tool.

When using segmented pipe couplings to secure the adjacent ends of pipes to each other, there is no guarantee that a hermetic seal will be formed at the radially extending end faces of the pipes. Thus, provision must be made to hermetically seal the joint at the outer periphery of the pipe ends.

This is accomplished by a folding back of the lining onto the outer periphery of the pipe ends for a distance sufficient that the lining on the pipe exterior will provide intimate sealing contact with the elastomeric gasket contained within the segmented pipe coupling. A seal is thus formed at the pipe exterior, and which is entirely independent of any sealing action produced at the radially extending end faces of the pipes.

Commonly, pipes, including lined pipes, are provided with either cut or rolled grooves adjacent their ends, in order to accommodate the keys of the respective coupling segments. Also, commonly, the keys are required to bottom down in the grooves, thus to provide the required clamping action of the segmented pipe coupling onto the pipe ends. This consideration, in turn, determines the required internal diameter of the sealing gasket, which must be of a standard size for any particular standard size of coupling.

If the folded-back lining on the exterior of the pipe extends beyond the outer diameter of the pipe, then, this will require a non-standard sealing gasket having an internal diameter that is greater than that of the internal diameter of a standard sealing gasket. Not only is the provision of a non-standard gasket an inconvenience in warehousing of the couplings, but, there is a danger that a careless workman will assemble a non-standard gasket into the coupling, when, in fact, a standard gasket is required, the two versions of the gaskets differing in visually imperceptible respects.

If a non-standard gasket is assembled into a standard segmented pipe coupling, the probability is that insufficient compressive force will be applied to the gasket upon tightening down of the coupling to insure against leakage axially of the exterior surface of the pipe ends.

Knowing of this problem, rather than to have the folded-back lining on the exterior of the pipe ends extend beyond the outer diameter of the pipes, it has been common practice to machine the pipe ends to a reduced external diameter, thus to accommodate the folded-back lining on the pipe exterior. The folded-back lining then can be arranged to have an external diameter identical with the exterior diameter of the pipe end, thus removing the necessity for a sealing gasket of non-standard dimensions. However, such a machining operation represents added cost in the manufacture of a piping system, and may reduce the mechanical strength of the pipe.

SUMMARY OF THE INVENTION

It is an object of this invention to provide lined metal pipe that is compatible with a segmented pipe coupling having a standard sealing gasket, thus obviating the need to provide non-standard gaskets, and also, to provide a lined metal pipe that eliminates the need for machining of the pipe ends in order to accommodate the folded back lining on the exterior surfaces of the pipe ends, such as is required in order to accommodate a sealing gasket of standard dimensions.

This is achieved by providing a lining of elastomeric material on the pipe interior that is a continuous coating of essentially uniform thickness which extends throughout the entire internal surface of the pipe, and which then extends radially outwardly across the end faces of the pipe. The lining then continues as a continuous coating extending along the external surface of the pipe, and which terminates at a position spaced inwardly of the axial edges of the sealing gasket.

The coating on the external surface of the pipe tapers in thickness from a maximum thickness at the end of the pipe, to substantially zero thickness at the position of termination of the coating. Since the liquid does not penetrate far into the interface between the gasket and lining, the reduced thickness does not comprise corrosion resistance.

The elastomeric seal of the segmented pipe coupling is specifically formed to accommodate flexure of the sealing lips within the sealing gasket. The lips must stretch to accommodate the thickness of the liner which has a larger circumference than the pipe. Thus, the axially extending sealing lips of the sealing gasket readily can accommodate themselves to the frusto-conical surface of the pipe lining positioned on the exterior surface of the pipe.

In this manner, the prior art step of machining the pipe end to accommodate the coating of elastomeric material is eliminated in its entirety, while at the same time, the utility of the lined pipe for use with a segmented pipe coupling having a sealing gasket of standard dimensions is preserved.

DESCRIPTION OF THE DRAWINGS

The invention will now be described with reference to the accompanying drawings, which illustrate preferred embodiments of the invention, and, in which.

DESCRIPTION OF THE PRIOR ART

Figure 1:
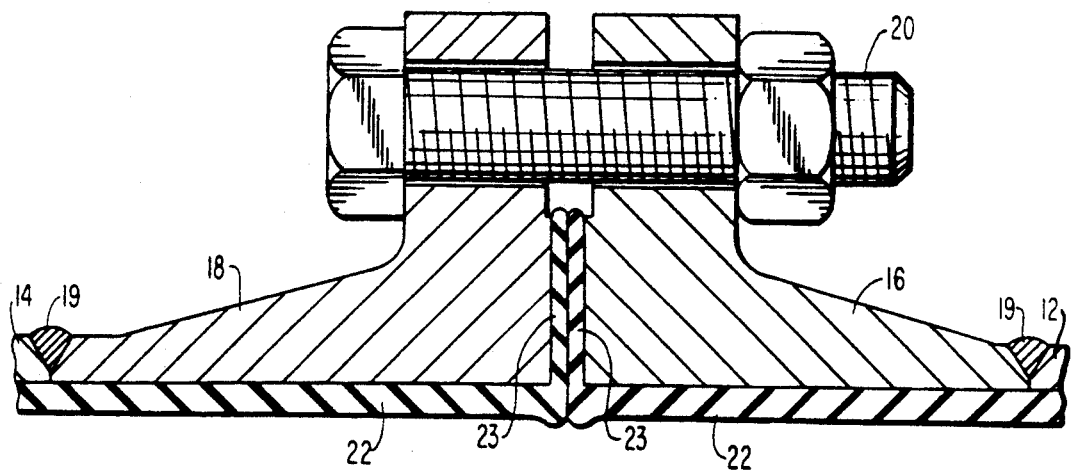
FIG. 1 is an illustration of a prior art form of flanged coupling provided with a lining of elastomeric material.

Referring firstly to FIG. 1, there is shown a conventional flanged coupling for lined pipes, which relies on axial compression to form a hermetic seal at the end faces of the flanges.

In FIG. 1, the respective pipes 12 and 14 have flanged coupling members 16 and 18 welded to their respective ends at 19, the flanged coupling members 16 and 18 being drawn axially into compressive relationship with each other by traction bolts 20.

The interior of the pipes 12 and 14, and also, the interior of the end flange members 16 and 18 are provided with a continuous coating 22 of an elastomeric material, the continuous coating 22 extending continuously radially outwardly of the radial end faces of the end flanges 16 and 18.

Thus, upon tightening down of the bolts 20, the elastomeric material 23 on the radial end faces of the flanged members 16 and 18 is forced compressively into engagement, thereby providing the required hermetical seal between the end faces of the coupling members.

This construction is, however, an extremely expensive one to produce. Not only must the end flanges 16 and 18 be provided, but also, those end flanges must be welded to the ends of the respective pipes. Not only that, but, the resulting construction is a space-consuming one to warehouse, with a decided probability of damage occurring to the elastomeric material on the radial faces of the end flanges during storage and handling of the lined pipes. Further, the joint bending strength is limited by compression strength of the rubber, rather than metal-to-metal contact.

Figure 2:
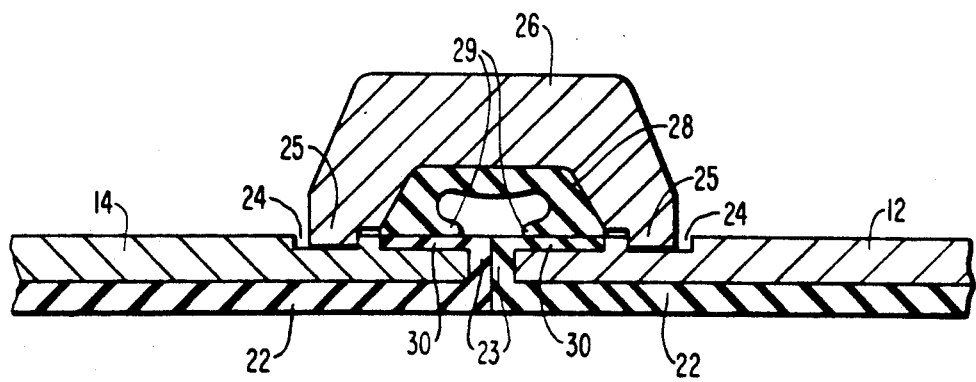
FIG. 2 is a cross-section through the prior art manner of accommodating lined pipe to a standard segmented pipe coupling.

FIG. 2 shows an alternative prior art construction, in which the end flanges 16 and 18 are eliminated, and, the possibility of damage to the elastomeric material on the end faces of the pipes during storage easily can be minimized by applying paperboard caps over the ends of the pipes.

In FIG. 2, the pipes 12 and 14 are provided with circumferential grooves 24 spaced from the end of the pipe, in which keys 25 of a coupling segment 26 of a segmented pipe coupling are received. As is well-known in the art, the respective coupling segments are drawn into clamping engagement with the pipe by means of traction bolts [not shown] that act on the adjacent ends of the respective coupling segments.

The coupling segment 26 contains an elastomeric seal 28 having sealing lips 29. The sealing lips 29 are forced into compressive engagement with the pipe ends upon tightening down of the coupling segments. The pipes 12 and 14 are provided with a continuous and impervious lining 22 of elastomeric material, which then extends radially and continuously of the end faces 23 of the pipes, and which then is folded back at 30 for it to extend along a sufficient length of the outer periphery of the pipes for it to be engaged in intimate sealing relation by the lips 29 of the gasket 28.

While the structure of FIG. 2 is eminently suited to its purpose, it is encumbered with major disadvantages. Those disadvantages arise from the requirement either to provide a non-standard gasket for incorporation into the segmented coupling in the event that the folded-back elastomeric lining is positioned on the exterior of an unmachined pipe end, or, the requirement for machining of the pipe end to a smaller external diameter in the event that a standard elastomeric gasket is to be employed, the folded-back elastomeric lining 30 then being, as is illustrated in FIG. 2, inset in the exterior surface of the pipe.

As will be apparent, machining of the pipe ends increases the cost of fabrication of the piping system. In the event that the ends of the pipes are not machined, then, non-standard sealing gaskets must be provided with consequential complications in warehousing, and, with the great disadvantage that a careless workman possibly will select a non-standard gasket, and use it in substitution for a standard gasket in the assembly of the segmented pipe coupling for conventional uses. The provision of non-standard gaskets thus cannot be countenanced in that without regard to the manner of identification of the non-standard gasket, such as by indicia or color coding, there is no way of preventing a workman from employing a non-standard gasket instead of a standard one. If a non-standard gasket is used instead of the standard one, then, the pressure-handling capability of the coupling is severely reduced, and, the probability of seepage axially along the operative faces of the sealing gasket is greatly increased.

Figure 3:
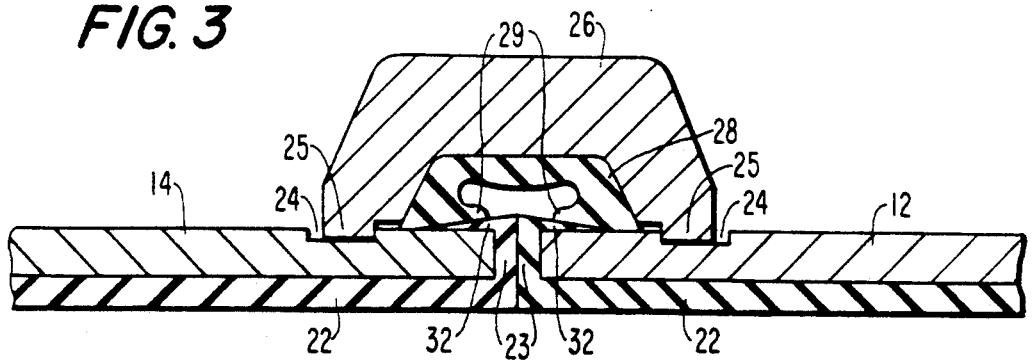
FIG. 3 is a cross-section through an elastomer lined metal pipe of the present invention when used in combination with a standard segmented pipe coupling.

These problems are obviated, as now discussed with reference to FIG. 3 of the drawings. In FIG. 3, the pipes 12 and 14 are cut-grooved at 24 in the conventional manner for the reception of keys 25 of the coupling segment 26, which contains a standard sealing gasket 28.

The respective pipes are provided with an elastomeric lining which extends continuously of the inner periphery of the pipe and also over the radial end faces of the respective pipes.

The respective ends of the pipes 12 and 14 are not machined in the manner discussed with respect to FIG. 2, but are left unmachined. The elastomeric lining is then folded back on the exterior surfaces of the ends of the pipes 12 and 14 in the form of an annulus having an outer surface comprised of a frustum of a cone.

The folded-back portions 32 terminate short of the grooves 24, and, also short of the axially opposite extremities of the sealing lips 29 of the elastomeric gasket 28. At their free ends, the sealing lips 29 exhibit maximum flexibility in a radially-outwards direction, thus permitting the sealing lips 29 to conform themselves to the frusto-conical surfaces of the folded-back portions 32, and this, in the total absence of any necessity to provide a sealing gasket 28 of non-standard dimensions, i.e. the sealing lips 29 merely rotate relative to the body of the sealing gasket 28 in order to accommodate the frusto-conical portions 32, while the axially outer extremities of the sealing gasket compressively engage the exterior surface of the respective pipes.

Figure 4:
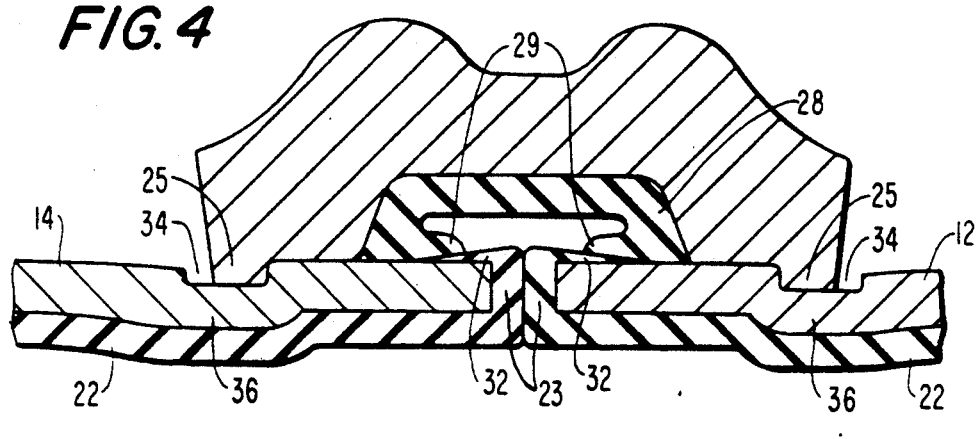
FIG. 4 is a cross-section through lined pipe according to the present invention that has been roll-grooved for use with a standard pipe coupling.

The same construction, as discussed above with respect to FIG. 3, is now discussed with respect to FIG. 4, which illustrates the difference in configuration between a cut-grooved pipe and a roll-grooved pipe.

In FIG. 4, the same reference numerals are employed to indicate structures identical with FIG. 3. In FIG. 4, the respective pipes 12 and 14 are formed with grooves 34 that have been produced by a roll-forming operation instead of a cutting operation. The formation of such grooves 34 by a rolling as opposed to a cutting operation, results in displacement of the metal underlying the grooves 34 in a radially inwards direction as indicated at 36. This, in turn, results in radially inwards bulging of the lining of elastomeric material in the vicinity of the inward bulges 36. Steps are formed on each axial side of the radially inward bulge 36, that may cause wear, especially when conveying highly abrasive slurries, in that turbulence and eddy currents are created at the respective opposite sides of the radially inward bulges 36.

Figure 5:
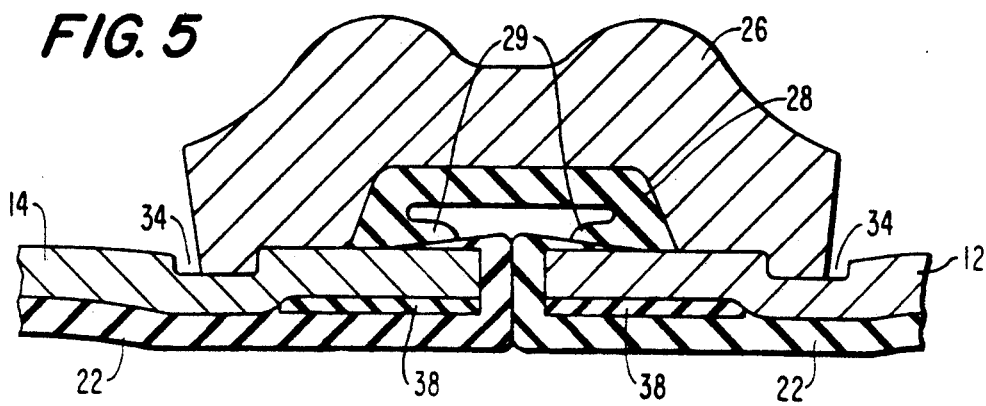
FIG. 5 shows a modification of the structure of FIG. 4.

FIG. 5 illustrates a manner in which such eddy currents can be restrained, the restraint of such eddy currents having the beneficial effect of reducing pressure losses in the pipe, and also having the beneficial effect of reducing abrasion and attrition at the joint.

In FIG. 5, filler strips 38 are inserted into the pipe ends subsequent to the rolling operation and prior to the formation of the lining 22 on the interior of the pipes. The filler strips are appropriately dimensioned such that the lining 22 remains of substantially constant diameter throughout the entire axial extent of the joint, thus suppressing eddy currents and reducing pressure losses at the joint.

While the invention has been described in relationship to keyed coupling segments, it will be understood that the invention finds equal application in any other form of segmented pipe coupling, including those which clamp directly onto the external surface of the pipes in the absence of keys on the coupling segments and grooves formed in the pipes, such couplings being viable in low pressure applications. The invention also finds application in segmented couplings in which the coupling segments are located axially of the pipes by pegs that are welded to the outer surface of the pipes, and which are received within grooves formed in the respective coupling segments, as also are well-known in the art.

What is claimed is:

1. Lined metal pipe of a type having a continuous impervious coating of an elastomeric material on an inner periphery thereof and on radial end surface thereof, further comprising, a terminal portion of said continuous coating contiguous with said coating on said radial end surface and directly contacting and extending axially of an outer periphery of said pipe, further comprising said terminal portion progressively decreasing in thickness from said radial end surface of said pipe to the axial termination of said portion at a position spaced axially from said radial end surface, in which said terminal portion is in the form of an annulus having a radially outer surface providing a frustum of a cone.

2. Lined metal pipe according to claim 1, further including a continuous circumferential groove formed in said pipe at a position spaced axially from said radial end surface, and in which said terminal portion terminates at a position spaced from said groove and intermediate said radial end surface of said pipe and an adjacent wall of said groove.

3. Lined metal pipe according to claim 1, in which there are two said pipes arranged coaxial with one another in combination with a segmented pipe coupling having a sealing gasket provided with axially directed and mutually presented sealing lips, in which said terminal portion of said coating of each said pipe terminate at a position intermediate opposite axial ends of said respective sealing lips, whereby a portion of the axial extent of each said sealing lip is in direct surface contact with the external surfaces of each said pipe, and the remaining portion of said axial extent of each said sealing lip is in direct surface contact with said terminal portion of said coating.

4. The combination of claim 3, in which said contact of each said sealing lip with said terminal portion of said coating is operative to produce rotation of a free edge of each said lip in a radially outwards direction.

5. The combination of claim 3, including a continuous groove formed peripherally of an outer surface of each said pipe at a position spaced from said radial end surface of each said pipe, said terminal portion of said coating terminating at a position intermediate said radial end wall of each said pipe and an immediately-adjacent side wall of said groove.

6. The combination of claim 5, in which said groove is a rolled groove, further including a filler strip inserted into each said pipe end, and, providing a continuation of the internal diameter of said pipes at positions intermediate each said groove and said end faces of each said pipe, whereby to suppress eddy currents in said pipes in the vicinity of said rolled grooves.

* * * * *